United States Patent
Anderson

[11] 3,921,907
[45] Nov. 25, 1975

[54] SPRAY DEVICE

[76] Inventor: Jack William Anderson, Rt. 1, East Berlin, Pa. 17316

[22] Filed: Nov. 29, 1974

[21] Appl. No.: 528,551

[52] U.S. Cl. ............................... 239/172; 222/176
[51] Int. Cl.[2] .......................................... B05B 9/04
[58] Field of Search ........... 239/172, 146, 147, 175, 239/176, 286; 222/176, 177, 178

[56] References Cited
UNITED STATES PATENTS

| | | | |
|---|---|---|---|
| 1,385,684 | 7/1921 | Howell | 239/172 |
| 2,621,074 | 12/1952 | Hurlbert | 239/146 |
| 3,265,308 | 8/1966 | Hopkins | 239/172 |
| 3,320,694 | 5/1967 | Biron | 222/176 X |
| 3,792,814 | 2/1974 | Platz | 239/172 X |

Primary Examiner—John J. Love

[57] ABSTRACT

A pressurizable tank for containing liquid fertilizer or the like is positioned transversely upon a two-wheeled carriage that can be pulled by a vehicle or by hand. The tank has a filler opening at one end. A container of pressurized gas is also attached to the frame adjacent to the tank. Suitable hoses and valves connect the pressurized container to the tank for charging the tank. Liquid flows from the tank through a hose to a spray nozzle that sprays it upon the ground. Interposed in the line from the tank is a quick-acting valve to control liquid flow. To facilitate safe filling of the fertilizer tank, the entire apparatus can be tipped on its side, resting upon the end of the fertilizer container opposite the filler opening. An auxiliary hand-operated nozzle system can be interchanged with the ground spray nozzle.

8 Claims, 6 Drawing Figures

SPRAY DEVICE

BACKGROUND OF THE INVENTION

This invention relates to chemical spraying equipment, and more particularly to an improved portable spraying device mounted on a wheeled carriage.

The prior art contains a multitude of portable spraying devices for applying fertilizer and the like to the ground as well as trees, bushes and such. However, the prior art devices were often difficult to manage in operation, and difficult to fill.

SUMMARY OF THE INVENTION

It is an object of this invention to provide an improved portable chemical spraying apparatus for applying fertilizer or the like to the ground and to trees, shrubs and such.

Another object of this invention is to provide an improved portable chemical spraying apparatus that uses inexpensive and readily available propulsion gas.

Still another object of this invention is to provide an improved portable chemical spraying apparatus that can easily and safely be filled.

Still another object of this invention is to provide an improved portable chemical spraying apparatus in which the dispensing of the chemical is precisely controlled.

Still another object of this invention is to provide an improved portable chemical spraying apparatus in which the pressure at which the fluid is dispensed can be precisely controlled.

Further objects and advantages of this invention will become apparent from the following description.

DESCRIPTION OF THE PREFERRED EMBODIMENT

Figure 1:
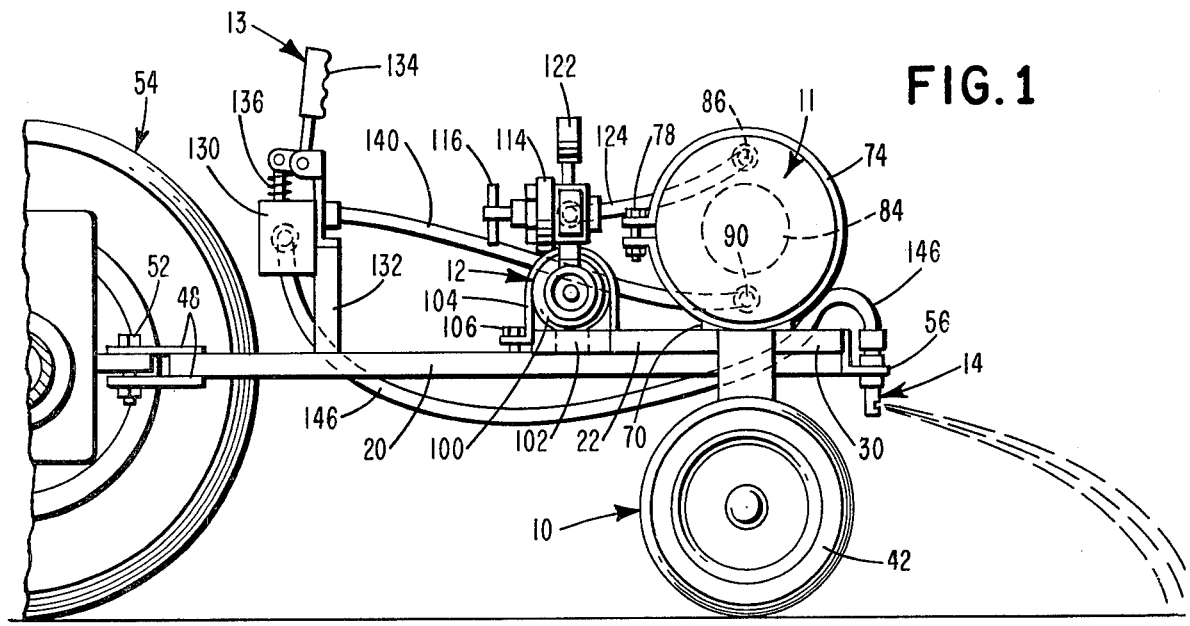
FIG. 1 is a side view of a portable chemical spraying apparatus in accordance with the invention.

The major components of the inventive apparatus are a wheeled carriage 10, a liquid chemical tank 11, a pressurized fluid tank and associated controls 12, a spray control mechanism 13, and a spray nozzle 14.

Wheeled carriage 10 comprises a main frame member 20, to which is attached a tank support frame generally indicated as 22, which itself comprises a front member 24, a rear member 26, and side members 28 and 30. Extending downwardly from side members 28 and 30, and attached respectively thereto, are a pair of wheel supports 34 and 36. Wheels 40 and 42 are attached in a conventional manner to wheel supports 34 and 36, for example, by stub axles (not shown) attached by nuts 44. Wheel spacers 46 are used to properly position each of the wheels from wheel supports 34 and 36. The free end of main frame member 20 terminates in a pair of hitch plates 48, which are in opposed relationship to one another and are attached, as by welding, to the upper and lower surfaces of member 20.

Each hitch plate 48 is provided with an opening 50, which receives a bolt 52 to attach the device to the rear of a pulling vehicle, such as a tractor 54. Centrally located on rear member 26, and attached thereto, is a flange 56, to which the spray nozzle is attached, as explained below.

Figure 2:
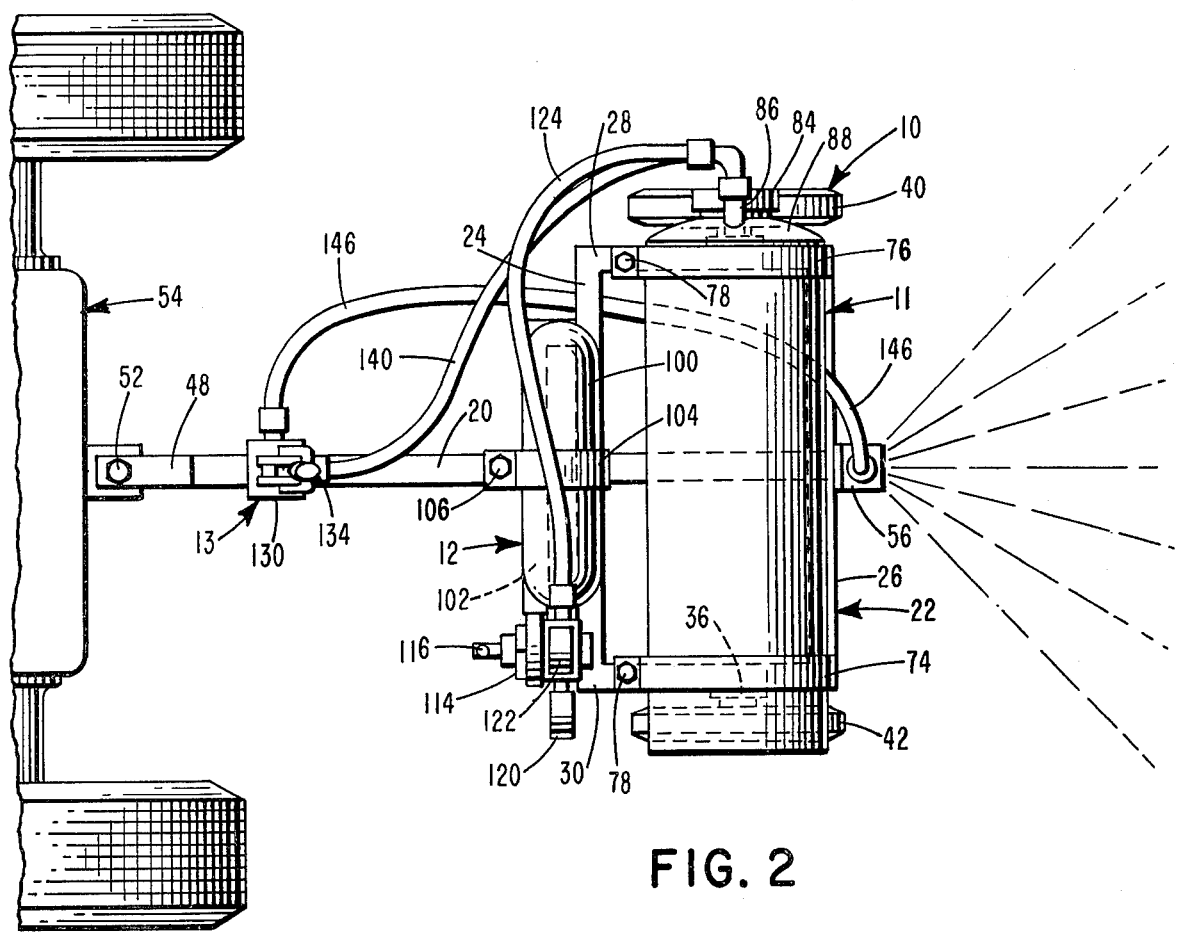
FIG. 2 is a top view of the apparatus shown in FIG. 1.
Figure 3:
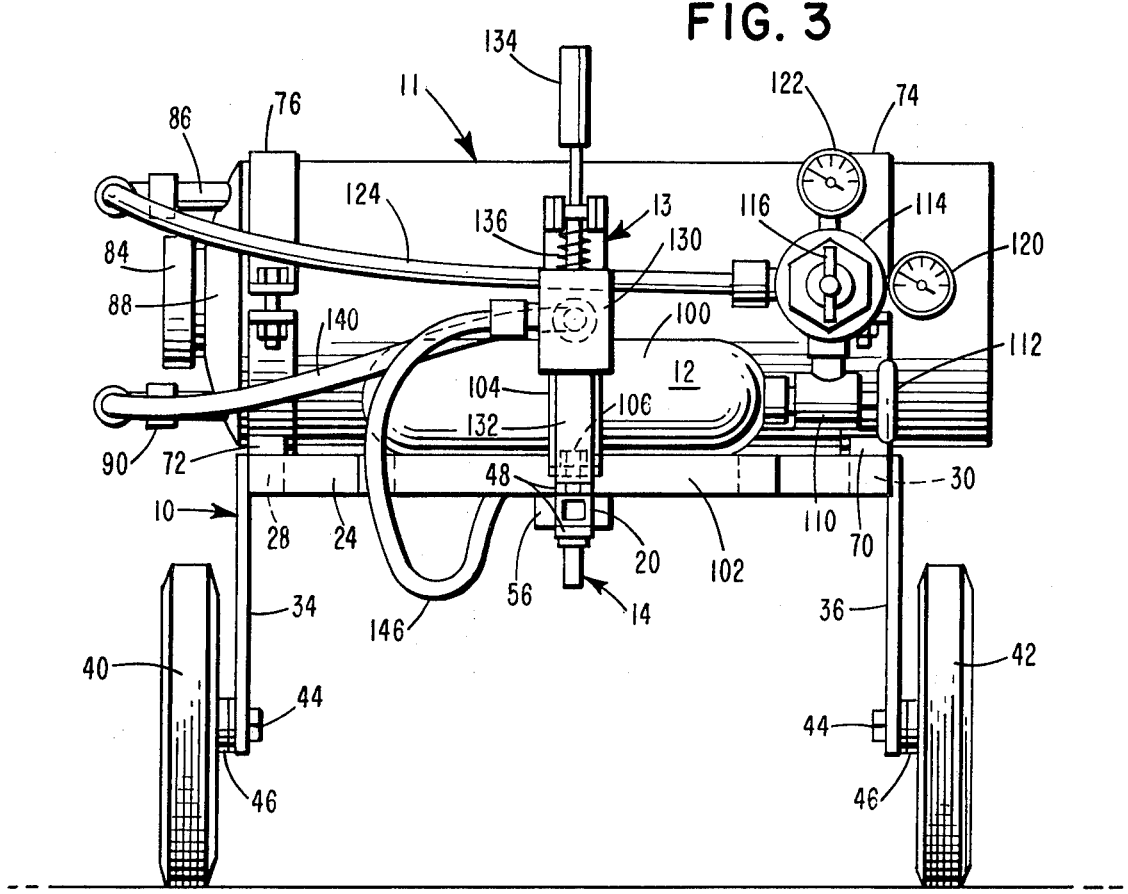
FIG. 3 is a front view of the apparatus shown in FIG. 1.
Figure 4:
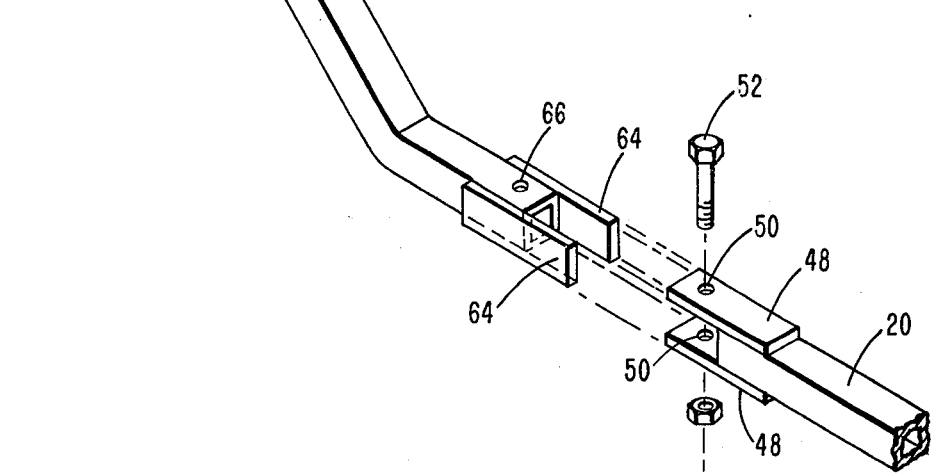
FIG. 4 is a perspective view of an alternative handle usable with the apparatus of FIG. 1.
Figure 5:
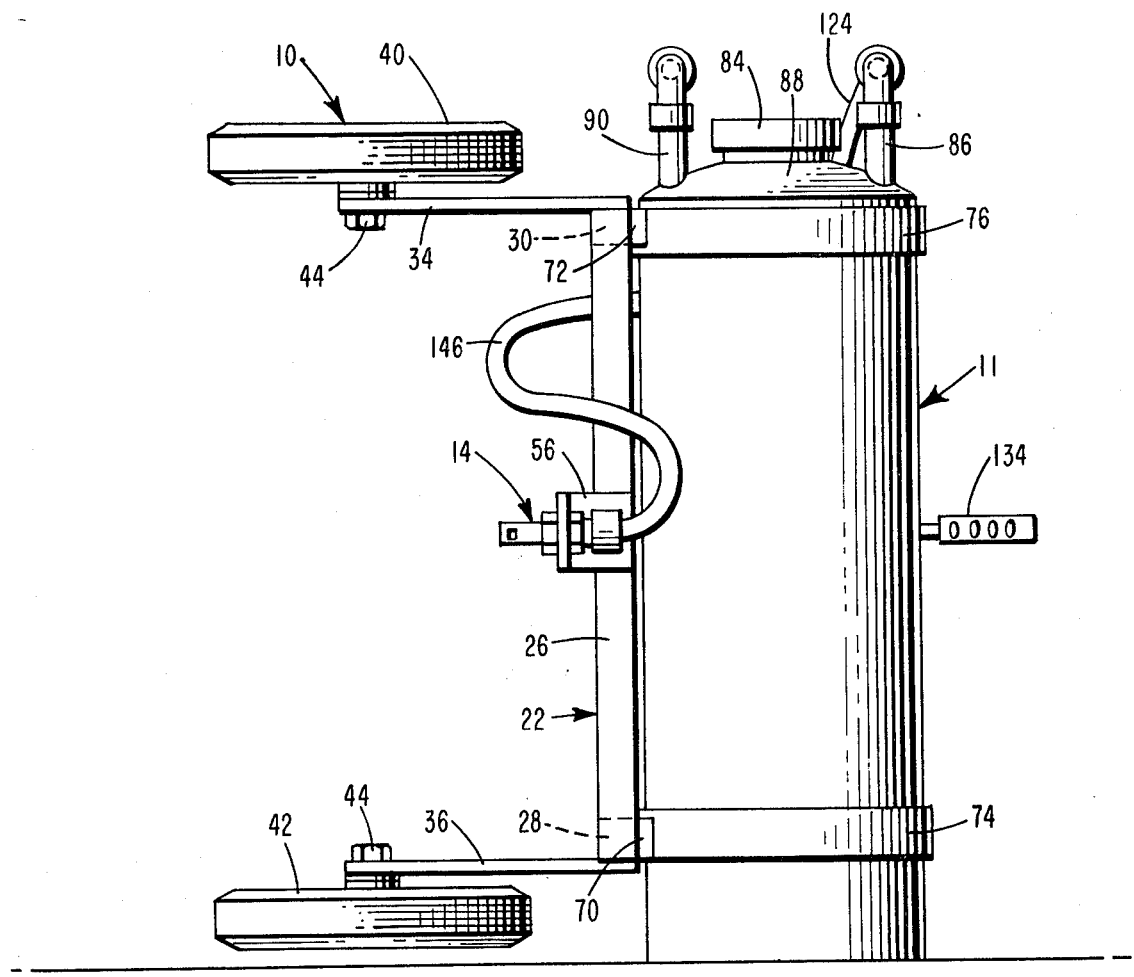
FIG. 5 is a rear view of the apparatus shown in the position for filling the chemical tank.

While the apparatus is shown in FIGS. 1 and 2 as being pulled by a vehicle such as a tractor, provision is also made to move it manually. Such is shown in FIG. 4. An auxiliary handle 60 is formed in such a manner as to present a convenient height to the user. At one end of handle 60 is a handgrip 62. At the other end of handle 60 are a pair of connector plates 64 which are welded to the sides of the handle 60. A pair of openings 66 are provided in handle 60 to receive bolt 52 for attaching handle 60 to main frame member 20, as shown in FIG. 4. Since handle 60 and main frame member 20 are both of rectangular shape of identical dimension, an interlocking relationship is established by plates 48 and 64, which provide a rigidity between handle 60 and main frame member 20.

Mounted atop carriage 10 is a cylindrical liquid storage tank 11. A pair of cradle blocks 70 and 72 are attached, respectively, to side frame members 30 and 28. A pair of encircling tank clamps 74 and 76 are attached respectively to cradle blocks 70 and 72. Tank 11 is held within the confines of clamps 74 and 76, positioned on its side laterally with respect to carriage 10. Clamps 74 and 76 are secured by bolts 78. The bottom 80 of tank 11 is flat, and tank 11 is so positioned on carriage 10 that a plane through bottom 80 is substantially parallel to, but spaced slightly outward of, a plane through the side of wheel 42.

On its other end, tank 11 is provided with a filler opening, closed by a cap 84. Cap 84 can be one of many known types used in pressure containers. Top 88 of tank 11 is also provided with a gas inlet pipe 86 that communicates with the interior. A fertilizer outlet pipe 90 also protrudes through top 88. Gas inlet pipe 86 is in the upper portion of tank 11, and fertilizer outlet pipe 90 communicates with the lower portion. Thereby, fluid is forced from pipe 90 by the pressurized gas admitted to the upper portion of tank 11 through pipe 86.

Pressurized gas to force fertilizer from tank 11 is provided by means of a pressure bottle 100, which can contain pressurized fluids such as $CO_2$ and can in fact be a conventional fire bottle. Gas bottle 100 is attached to main frame member 20 by means of a support piece 102 and a holding strap 104, which is secured by means of a bolt 106. Attached to the outlet of gas bottle 100 is a conventional shut-off valve 110 operated by a hand-wheel 112. Communicating with shut-off valve 110 is a control valve 114 having a control handle 116. A gas bottle pressure gauge 120 communicates with the gas bottle side of control valve 114, and a line pressure gauge 122 communicates with the tank side of control valve 114. Thereby, gas bottle gauge 120 is indicative of the amount of propellant remaining in the gas bottle, while gauge 122 indicates the pressure being applied to tank 11. Attached between control valve 114 and gas inlet pipe 86 is a gas supply line 124, connected with suitable conventional fittings.

Spray control valve 13 is advantageously of the quick-acting type and comprises a valve body 130, which is attached to main frame member 20 by means of a strut 132. Valve 130 is operated by a handle 134, through a rod 136. This handle is positioned to be an easy reach of the operator, and enables him quickly to turn the spray on or off. Thus, precise application of fertilizer is facilitated, as in quick termination for safety reasons. Providing communication between quick-acting valve 13 and discharge pipe 90 is a second flexible conduit 140, connected with suitable fittings.

Figure 6:
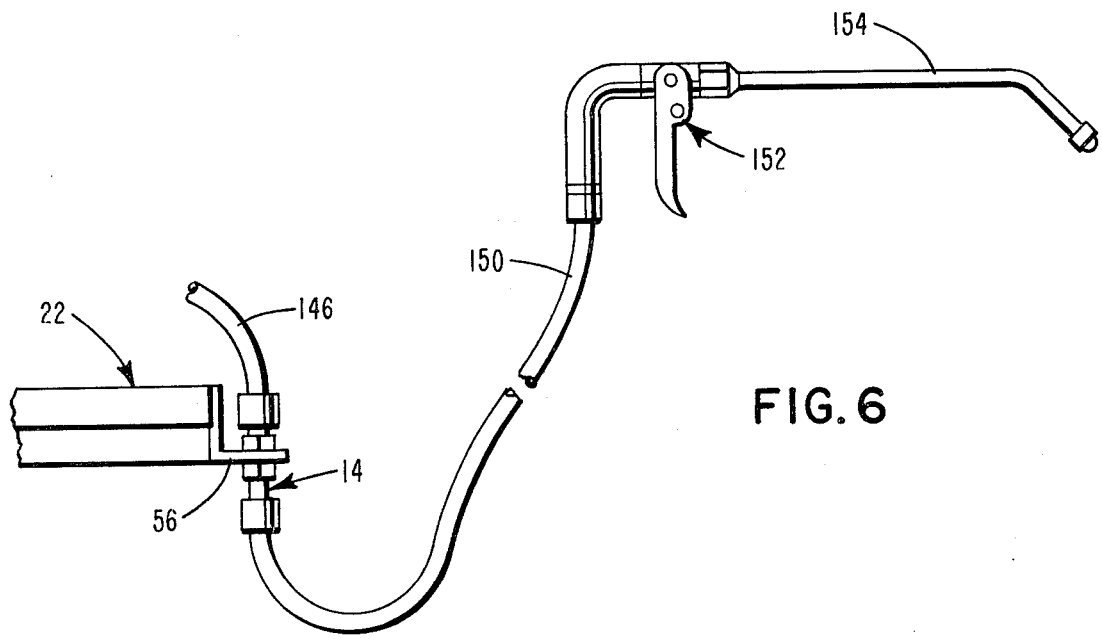
FIG. 6 is a side view of an optional hand sprayer usable with the apparatus of FIG. 1.

Mounted, at the rear of the apparatus, upon flange 56, is a spray nozzle 14 for dispensing the fertilizer. The fertilizer is communicated to nozzle 14 by a flexible line 146 extending from the discharge side of valve 13. Advantageously, spray nozzle 14 is attached to hose 146 by some sort of detachable fitting, so that a hand-gun type sprayer can alternatively be utilized, as illustrated in FIG. 6. A flexible hose 150 then replaces nozzle 14, and communicates with a hand-sprayer assembly 152, of conventional configuration, having a spray wand 154.

The operation of the apparatus is as follows: In order to fill the tank 11 with the desired fertilizer or other chemical, the entire apparatus is tilted upon its side so that it rests upon bottom 80 of tank 11. It should be noted that if the device is on uneven surface, wheel 42 can be so oriented as to provide the necessary secondary support. For this reason, a particular relationship between bottom 80 and wheel 42 is necessary. Once the tank is on its side, top 84 is removed and the desired kind of liquid fertilizer or other chemical is placed into tank 11. Top 84 is then sealed and the apparatus placed upon its wheels. Shut-off valve 112 is then moved to the open position, in suitable operation of control valve 116 communicates the desired dispensing pressure to tank 11, as indicated on gauge 122. Spraying begins when spray control valve 13 is opened.

If ground spraying is to be done, nozzle 14 is installed and the apparatus can then be hitched onto a tractor, or pulled by hand, by means of handle 60. If the hand sprayer is to be used, nozzle 14 is removed, in favor of hose 150. Spray control valve 13 is opened, but the actual dispensing is advantageously controlled by the trigger provided on the hand-spraying unit. It should be noted that valve 13 is positioned so that it is readily available to the operator in order to begin and end the fertilizer dispensing operation on short notice. This provides for very accurate depositing of the fertilizer, and also provides for a good deal of safety since the device can quickly be turned off. While not a requirement, it is common to spring load such valves to the "off" position so that they will only operate when the handle is held.

At any time throughout the operation, and when no fertilizer is being dispensed also, the amount of gas available in gas bottle 100 is easily ascertained by a reading of gauge 120. Also, precise control can be exercised over the amount of fertilizer being dispensed through either of the nozzles, and the coverage of the spray, by suitable adjustment of control valve 116. The pressure within the tank 11, which is related to the amount of fertilizer that will be dispensed, is indicated by gauge 122.

Although but a single embodiment of the present invention has herein been illustrated and described, it will be apparent to those skilled in the art that various changes and modifications may be made therein without departing from the spirit of the invention or from the scope of the appended claims.

I claim:
1. A chemical spraying apparatus comprising:
   a carriage having a pair of laterally spaced wheels,
   a pressurizable chemical tank mounted transversely on said carriage, said chemical tank having first and second ends, said first end terminating in a substantially flat surface and said second end being provided with a chemical tank filler opening, said first end being so positioned on said carriage that a plane through said flat surface is substantially parallel to a plane through one of said wheels and is spaced laterally outwardly with respect thereto,
   a gas storage bottle for holding pressurized gas mounted on said carriage and being in communication with said chemical tank,
   first valve means for controlling the flow of pressurized gas from said gas bottle to said chemical tank,
   chemical spray nozzle means, and
   second valve means for controlling the flow of chemical from said chemical tank to said nozzle means.

2. The apparatus of claim 1 further comprising first pressure gauge means for indicating the pressure in said chemical tank and second pressure gauge means for indicating the pressure in said gas bottle.

3. The apparatus of claim 1 wherein said chemical tank is of elongated cylindrical shape.

4. The apparatus of claim 1 wherein said nozzle means is mounted on said carriage, and wherein chemical is supplied to said nozzle means by a nozzle supply line removably attached to said nozzle means.

5. The apparatus of claim 4 further comprising hand spray nozzle means attachable to said nozzle supply line.

6. The apparatus of claim 1 wherein said second valve means is of the quick operating cut-off type.

7. The apparatus of claim 1 further comprising hitch means attached to said carriage for attachment to a pulling vehicle, and auxiliary handle means attachable to said hitch means for allowing said carriage to be moved by hand.

8. A chemical spraying apparatus comprising:
   a carriage having a pair of laterally spaced wheels,
   a pressurizable chemical tank mounted transversely on said carriage, said chemical tank having first and second ends, said first end terminating in a substantially flat surface and said second end being provided with a chemical tank filler opening, said first end being so positioned on said carriage that a plane through said flat surface is substantially parallel to a plane through one of said wheels and is spaced laterally outwardly with respect thereto,
   first valve means for controlling a flow of pressurizing medium into said chemical tank,
   chemical spray nozzle means, and
   second valve means for controlling the flow of chemical from said chemical tank to said nozzle means.

* * * * *